2,961,407
Patented Nov. 22, 1960

2,961,407

MIXED FERRITE COMPOSITION

Leon T. Piekarski, Scotia, N.Y., assignor to General Electric Company, a corporation of New York No Drawing. Filed June 30, 1954, Ser. No. 440,540

3 Claims. (Cl. 252—62.5)

This invention relates to a mixed ferrite composition having improved magnetic properties. It is particularly concerned with the mixed spinel-type crystal ferrite consisting essentially of nickel ferrite, zinc ferrite and manganese ferrite.

Soft ferromagnetic materials of the mixed ferrite type are known. Previously known work, however, has been primarily concerned with two and three component systems, i.e., spinel-type ferrites made by firing iron oxide with one or two other metal oxides. One such previously investigated three component ferrite system comprised a zinc-manganese ferrite. It was found that the mixed iron, zinc and manganese oxides required a nitrogen atmosphere during firing if the resulting crystal ferrite was to have maximum magnetic properties.

A principal object of my invention is the provision of a soft ferromagnetic spinel-type mixed ferrite material having high initial permeability, high resistivity, and high Q value. A further object of my invention is the provision of a soft ferromagnetic spinel ferrite composed of a mixture of nickel, zinc, manganese and iron oxides having high magnetic and electrical properties which may be produced by firing in an air atmosphere. Other objects of my invention will become apparent to those skilled in the art from the following disclosure.

I have invented a four component nickel-zinc-manganese ferrite having improved magnetic properties and, contrary to the behavior of known manganese ferrites, I have discovered that firing the four component manganese ferrites in nitrogen produces inferior properties compared to firing in an air atmosphere. More specifically, I have found that nickel-zinc-manganese ferrites containing from about 40 to 60, preferably 47 to 49, mol percent iron oxide, $Fe_2O_3$, from about 20 to 35 mol percent, preferably 29 to 31 mol percent, zinc oxide, ZnO, from 0.5 to 4.0, preferably 1 to 2 mol percent, manganese oxide, MnO, balance nickel oxide, NiO, are characterized by a combination of properties including a high initial permeability plus good Q values and high D.C. resistivity values. By Q value is meant the numerical value obtained by dividing the radio frequency reactance by the resistance of a circuit in which the ferrite is introduced as an induction coil core body. Any of the various manganese oxides such as MnO, $Mn_2O_3$, $Mn_3O_4$ and $MnO_2$, for example, within the designated mol proportions can be employed. Preferably the iron oxide and zinc oxide are used in such proportions that the nickel oxide content will range from about 18 to 22 mol percent.

A particularly useful ferrite within the scope of the present invention is one containing 47 to 49 mol percent iron oxide, 29 to 31 percent zinc oxide, 2.0 mol percent manganese oxide and 18 to 22 mol percent nickel oxide. The resultant mixed ferrite is characterized by a high merit factor value (a product obtained by multiplying the initial permeability by the Q value) of about 32,000, and a resistivity measured in megohm centimeters of about 20,000 or more, providing it is fired in air. The same composition fired in nitrogen as suggested in the prior art, however, is characterized by a merit factor of about 15,000 and a resistivity of about 2900 to 3000 megohm centimeters.

The ferrites of the present invention are prepared by mixing the finely divided oxides as, for example, by grinding them together in a colloid mill using water as a suspension medium. After thorough mixing, the water is driven off and the resultant material pulverized to pass through a 40 mesh sieve. The resultant powder, with or without the addition of a small amount of a temporary binder, is molded into a suitable form and fired at a temperature of from 1100 to 1400° C., preferably 1100 to 1200° C., to obtain a reaction between the oxides forming the mixed crystal ferrites. As will become apparent later, temperatures in excess of about 1250° C. result in a striking decline of magnetic properties of the material. A firing cycle requiring six hours to reach the temperature of about 1200° C., holding that temperature for four hours and cooling to room temperature in about eight hours, has been found to be satisfactory to obtain the desired heat reaction products. The firing should be carried out in an oxidizing atmosphere. An air atmosphere has been found to produce the above-cited magnetic properties.

For best results the manganese oxide content should be at least 0.75 mol percent and not more than about 2.5 mol percent, and preferably between 1 and 2 mol percent. The effects obtained by varying the manganese oxide content of a mixed ferrite obtained by firing mixtures of about 48 mol percent iron oxide, and 30 mol percent zinc oxide with the designated quantities of manganese oxide and the balance nickel oxide, at 1200° C. are set forth in the following table in which the initial magnetic permeability $\mu_0$ and Q values were measured at 0.6 megacycle and $7.5 \times 10^{-4}$ oersteds on a ring sample and a specific resistivity, $\rho$, is the D.C. resistivity in megohm centimeters.

*Table I*

[1,200° C. in air]

| Percent MnO | ρ (meg. cm.) | 0.6 Mc. (Room Temperature) | | |
|---|---|---|---|---|
| | | $\mu_0$ | Q | $\mu_0 \cdot Q$ |
| 0.0 | 53.0 | 178.5 | 79.8 | 14,250 |
| 0.5 | 524.0 | 260 | 69.0 | 17,950 |
| 1.0 | 25,000 | 323 | 66.0 | 21,300 |
| 2.0 | 20,200 | 488 | 65.6 | 32,000 |
| 4.0 | 137 | 469 | 46.5 | 21,800 |
| 8.0 | 3.84 | 206 | 81.5 | 16,800 |
| 12.0 | 0.274 | 450 | 60.7 | 27,300 |

As is indicated by the data given in this table and the additional data given hereinafter, many of the manganese containing ferrites of the present invention can be employed advantageously for various magnetic core applications.

When the compositions listed in Table I were fired at the same temperature in nitrogen, a substantial decline in the magnetic properties, set forth below, are found.

*Table II*

[1,200° C. in $N_2$]

| Percent MnO | ρ (meg. cm.) | 0.6 Mc. (Room Temperature) | | |
|---|---|---|---|---|
| | | $\mu_0$ | Q | $\mu_0 \cdot Q$ |
| 0.0 | 46.5 | 228.0 | 59.0 | 13,460 |
| 0.5 | 95.8 | 71.4 | 70.4 | 5,020 |
| 1.0 | 5,710 | 184.2 | 83.5 | 15,400 |
| 2.0 | 2,960 | 179.0 | 83.4 | 14,920 |
| 4.0 | 198 | 187.5 | 53.8 | 10,100 |
| 8.0 | 22.2 | 239.5 | 67.7 | 16,220 |
| 12.0 | 0.256 | 156.9 | 71.0 | 11,120 |

As suggested previously, firing temperatures in excess of 1250° C. produces a considerable decline in the magnetic propreties of these materials. In Table III it will be seen that an increase in firing temperature of 150° C. over that employed for firing the ferrites in Table I produces a profound effect upon the material.

*Table III*

[MnO addition 1,350° C. in air]

| Percent MnO | $\rho$ (meg. cm.) | 0.6 Mc. (Room Temperature) | | |
|---|---|---|---|---|
| | | $\mu_0$ | Q | $\mu_0 \cdot Q$ |
| 0.0 | 0.084 | 350 | 16.0 | 5,600 |
| 0.5 | 2.05 | 318 | 39.6 | 12,600 |
| 1.0 | 4.06 | 463 | 18.8 | 8,720 |
| 2.0 | 50.3 | 580 | 23.0 | 13,300 |
| 4.0 | 3.30 | 756 | 13.8 | 10,400 |
| 8.0 | 0.376 | 483 | 49.0 | 23,600 |
| 12.0 | 0.057 | 540 | 42.9 | 23,200 |

In Table IV the effect of a similarly high firing temperature in a nitrogen atmosphere is shown.

*Table IV*

[MnO addition 1,350° C. in $N_2$]

| Percent MnO | $\rho$ (meg. cm.) | 0.6 Mc. (Room Temperature) | | |
|---|---|---|---|---|
| | | $\mu_0$ | Q | $\mu_0 \cdot Q$ |
| 0.0 | 0.00205 | 202.0 | 35.7 | 7,200 |
| 0.5 | 0.63 | 276.5 | 33.3 | 9,220 |
| 1.0 | 3.44 | 427.0 | 18.7 | 8,000 |
| 2.0 | 1.66 | 532.0 | 10.9 | 5,800 |
| 4.0 | 11.60 | 777.0 | 12.3 | 9,500 |
| 8.0 | 0.224 | 482.0 | 49.4 | 23,800 |
| 12.0 | 0.159 | 501.0 | 42.0 | 21,050 |

From a consideration of the properties of various specific ferrites described hereinbefore, it is apparent that some of them are particularly characterized by high permeability values and others by high Q values. Those having both high permeability and high Q values or more specifically, a high merit factor, are particularly useful as cores for television sweep transformers and other applications requiring a high permeability plus a relatively high Q value and a high D.C. resistivity. It is to be noted, however, that the optimum values of resistivity and merit factor are dependent upon firing at a temperature of approximately 1200° C. in air and upon a manganese oxide content between 1.0 and 2.0 mol percent. As has been shown, higher firing temperatures, a non-oxidizing atmosphere, and either lower or higher concentrations of manganese results in a ferrite of considerably lower magnetic and electrical properties.

In the foregoing description of my invention, I have chosen certain specific compositions and treatments of compositions as examples for purposes of the disclosure and I intend to cover all changes and modifications of these examples which do not constitute departures from the spirit and scope of the invention. I do not intend the invention to be limited in any sense except as defined by the following claims.

What I claim as new and desire to secure by Letters Patent of the United States is:

1. A soft ferromagnetic spinel ferrite body having a resistivity of at least 20,000 megohm-centimeters at room temperature and a room temperature merit factor of at least 21,000 measured at 0.6 megacycle said body formed by firing a formed mixture of metal oxides consisting essentially of 47 to 49 mol percent iron oxide, 29 to 31 mol percent zinc oxide, 1 to 2 mol percent manganese oxide, and the balance nickel oxide, in an oxidizing atmosphere at 1150° C. to 1250° C.

2. A ferrite body as recited in claim 1 in which the iron oxide content is about 48 mol percent and the zinc oxide content about 30 mol percent.

3. A ferrite body as recited in claim 1 in which the oxidizing atmosphere is air.

References Cited in the file of this patent

UNITED STATES PATENTS

| 2,565,058 | Albers-Schoenberg | Aug. 21, 1951 |
| 2,626,445 | Albers-Schoenberg | Jan. 27, 1953 |

FOREIGN PATENTS

| 677,418 | Great Britain | Aug. 13, 1952 |